United States Patent
Mizusako et al.

(10) Patent No.: US 10,109,254 B2
(45) Date of Patent: Oct. 23, 2018

(54) VIDEO PROCESSING CIRCUIT, VIDEO PROCESSING METHOD, ELECTRO-OPTICAL DEVICE, AND ELECTRONIC APPARATUS

(71) Applicant: SEIKO EPSON CORPORATION, Tokyo (JP)

(72) Inventors: Kazuhisa Mizusako, Shiojiri (JP); Hiroyuki Hosaka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 313 days.

(21) Appl. No.: 15/113,423

(22) PCT Filed: Jan. 21, 2015

(86) PCT No.: PCT/JP2015/000263
§ 371 (c)(1),
(2) Date: Jul. 21, 2016

(87) PCT Pub. No.: WO2015/111406
PCT Pub. Date: Jul. 30, 2015

(65) Prior Publication Data
US 2017/0025084 A1    Jan. 26, 2017

(30) Foreign Application Priority Data

Jan. 22, 2014  (JP) ................. 2014-009630

(51) Int. Cl.
*G09G 3/36* (2006.01)
*G02F 1/1343* (2006.01)
(Continued)

(52) U.S. Cl.
CPC ......... *G09G 3/3696* (2013.01); *G09G 3/3614* (2013.01); *G09G 3/3655* (2013.01);
(Continued)

(58) Field of Classification Search
CPC .. G09G 3/3614; G09G 3/3655; G09G 3/3696; G09G 2300/0426;
(Continued)

(56) References Cited

U.S. PATENT DOCUMENTS

2011/0051006 A1  3/2011  Iisaka et al.
2011/0051007 A1  3/2011  Hosaka et al.
(Continued)

FOREIGN PATENT DOCUMENTS

JP    06-34965 A    2/1994
JP    2009-069608 A    4/2009
(Continued)

*Primary Examiner* — Nelson Rosario
(74) *Attorney, Agent, or Firm* — Maschoff Brennan

(57) ABSTRACT

A video processing circuit detects a boundary between a first pixel to which an application voltage which is a first voltage is applied, and a second pixel to which an application voltage which is a second voltage higher than the first voltage is applied, based on a video signal indicating a video which alternately switches a first video and a second video which is obtained by moving in parallel with the first video for each unit frame, corrects the application voltage such that a fringe electric field occurring at the boundary is decreased, when determining a boundary detected by the boundary detection unit in a kth unit frame does not exist in a (k−2)th unit frame, and the boundary is a boundary which is moved from a (k−1)th unit frame to the kth unit frame, and outputs the corrected video signal such that the liquid crystal panel is driven.

11 Claims, 12 Drawing Sheets

(51) Int. Cl.
 *G02F 1/1362* (2006.01)
 *G02F 1/1368* (2006.01)
(52) U.S. Cl.
 CPC ...... *G02F 1/1368* (2013.01); *G02F 1/134309* (2013.01); *G02F 1/136286* (2013.01); *G02F 2201/121* (2013.01); *G02F 2201/123* (2013.01); *G09G 3/3677* (2013.01); *G09G 3/3688* (2013.01); *G09G 2300/0426* (2013.01); *G09G 2320/0261* (2013.01); *G09G 2320/0646* (2013.01); *G09G 2320/103* (2013.01); *G09G 2340/04* (2013.01); *G09G 2340/0457* (2013.01)
(58) Field of Classification Search
 CPC ... G09G 2320/0261; G09G 2320/0646; G09G 2320/103; G09G 2340/04; G09G 2340/0457; G09G 3/367; G02F 1/134309; G02F 1/136286; G02F 1/1368; G02F 2201/121; G02F 2201/123
 See application file for complete search history.

(56) References Cited

U.S. PATENT DOCUMENTS

| | | | |
|---|---|---|---|
| 2011/0205440 A1* | 8/2011 | Hosaka | G09G 3/3648 |
| | | | 348/607 |
| 2013/0194249 A1 | 8/2013 | Kitagawa et al. | |
| 2013/0241914 A1 | 9/2013 | Kitagawa et al. | |
| 2013/0242194 A1 | 9/2013 | Kitagawa et al. | |
| 2013/0257844 A1 | 10/2013 | Kitagawa et al. | |
| 2014/0184914 A1* | 7/2014 | Oshima | H04N 5/445 |
| | | | 348/564 |

FOREIGN PATENT DOCUMENTS

| | | |
|---|---|---|
| JP | 2011-53390 A | 3/2011 |
| JP | 2013-152483 A | 8/2013 |
| JP | 2013-156409 A | 8/2013 |
| JP | 2013-195435 A | 9/2013 |
| JP | 2013-195488 A | 9/2013 |
| JP | 2013-205493 A | 10/2013 |
| JP | 2014-170096 A | 9/2014 |

* cited by examiner

[Fig. 1]
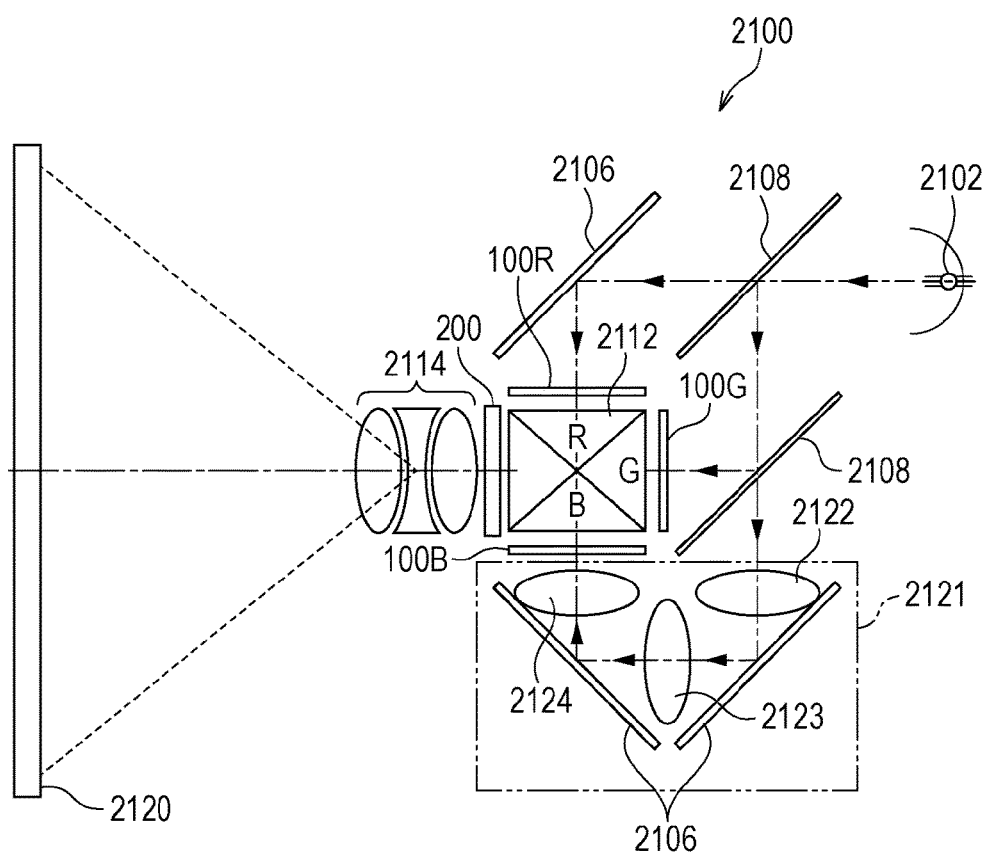

[Fig. 2]
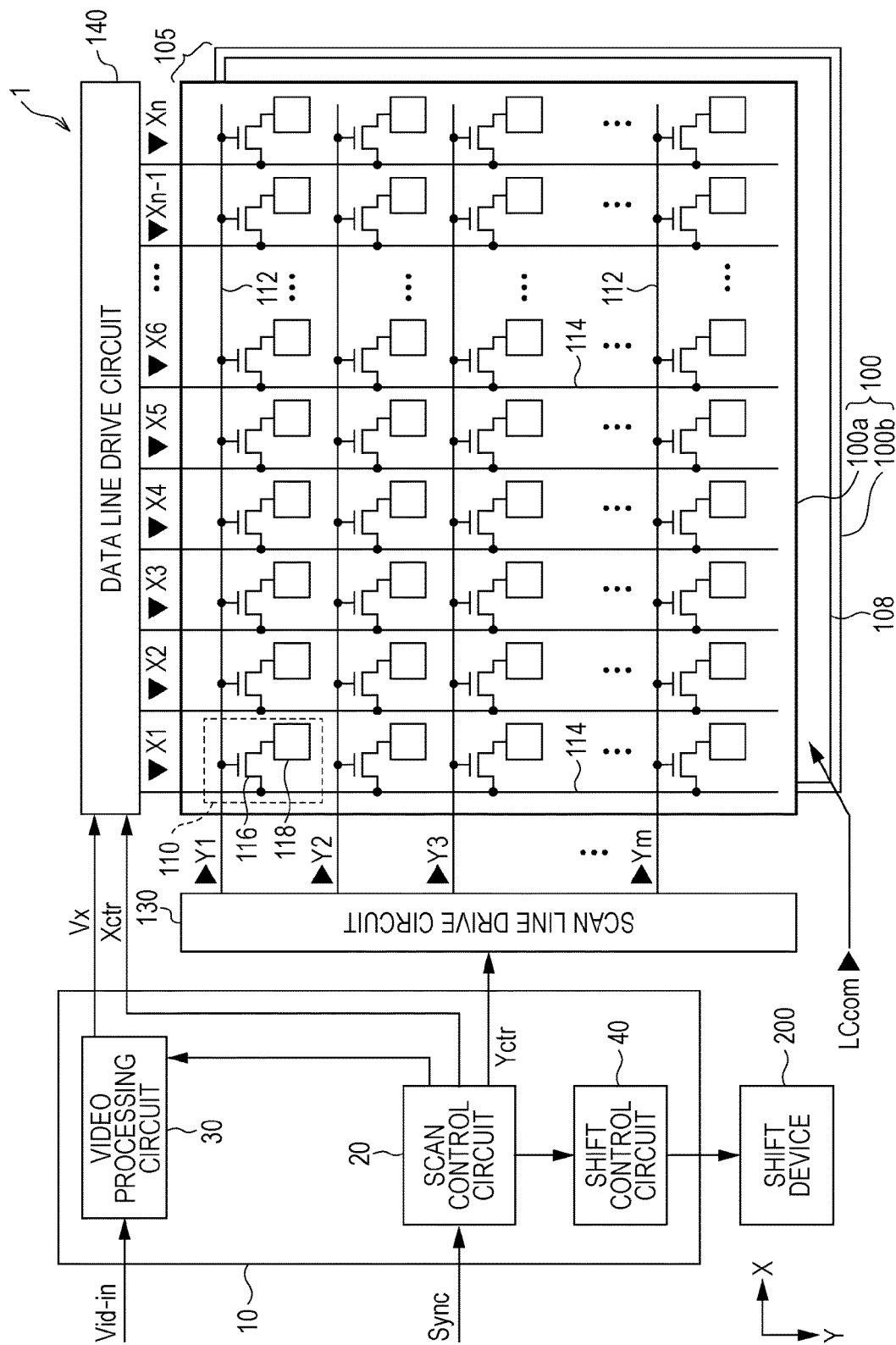

[Fig. 3]
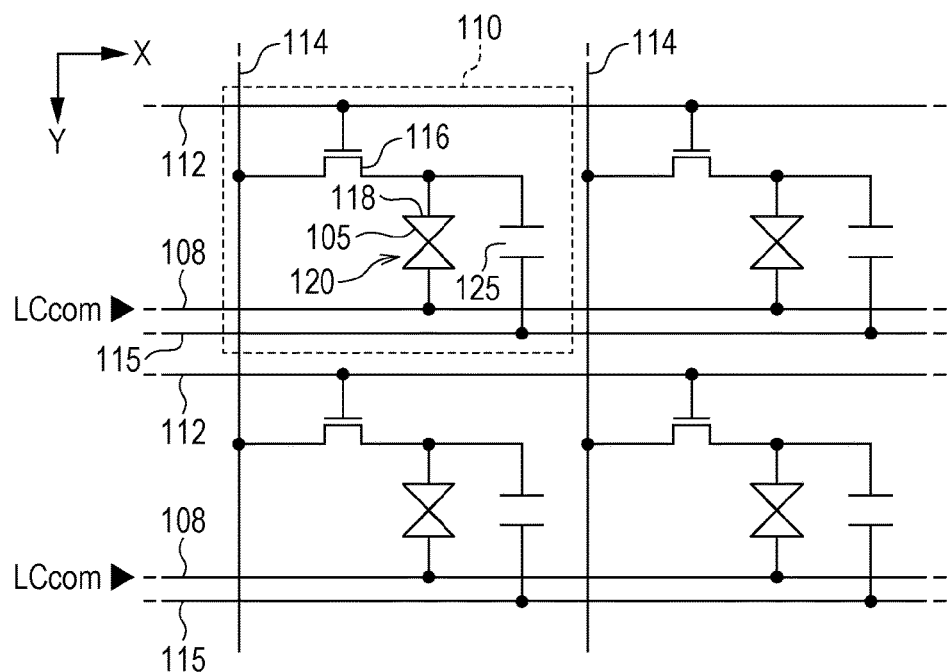

[Fig. 4]
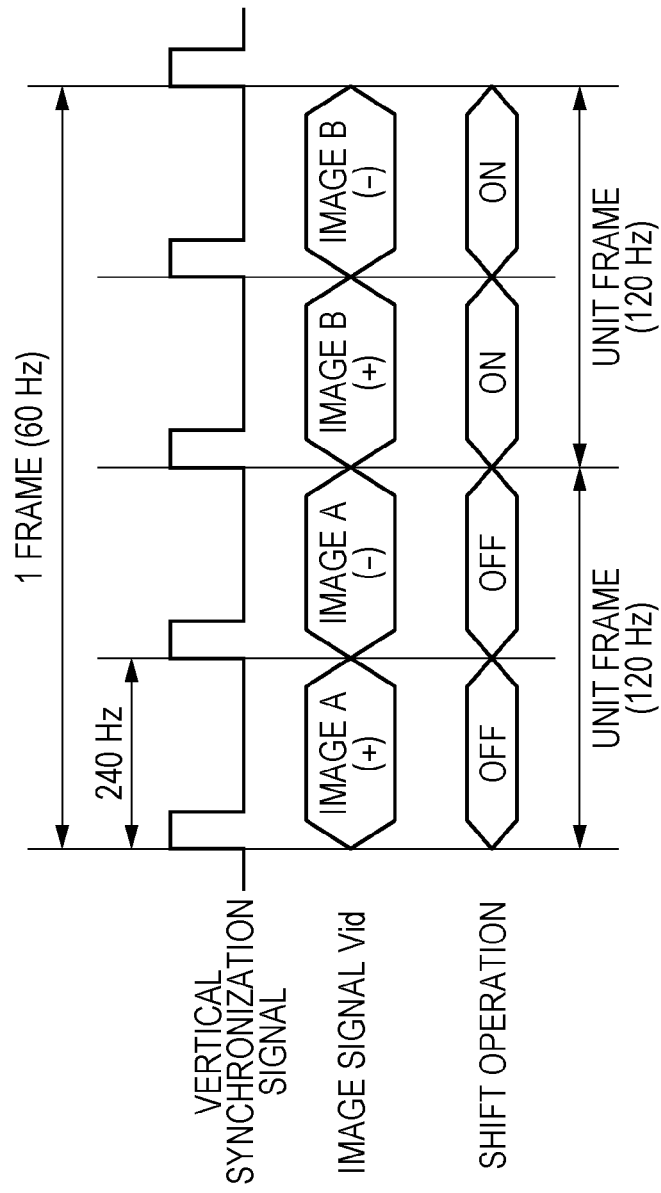

[Fig. 5]
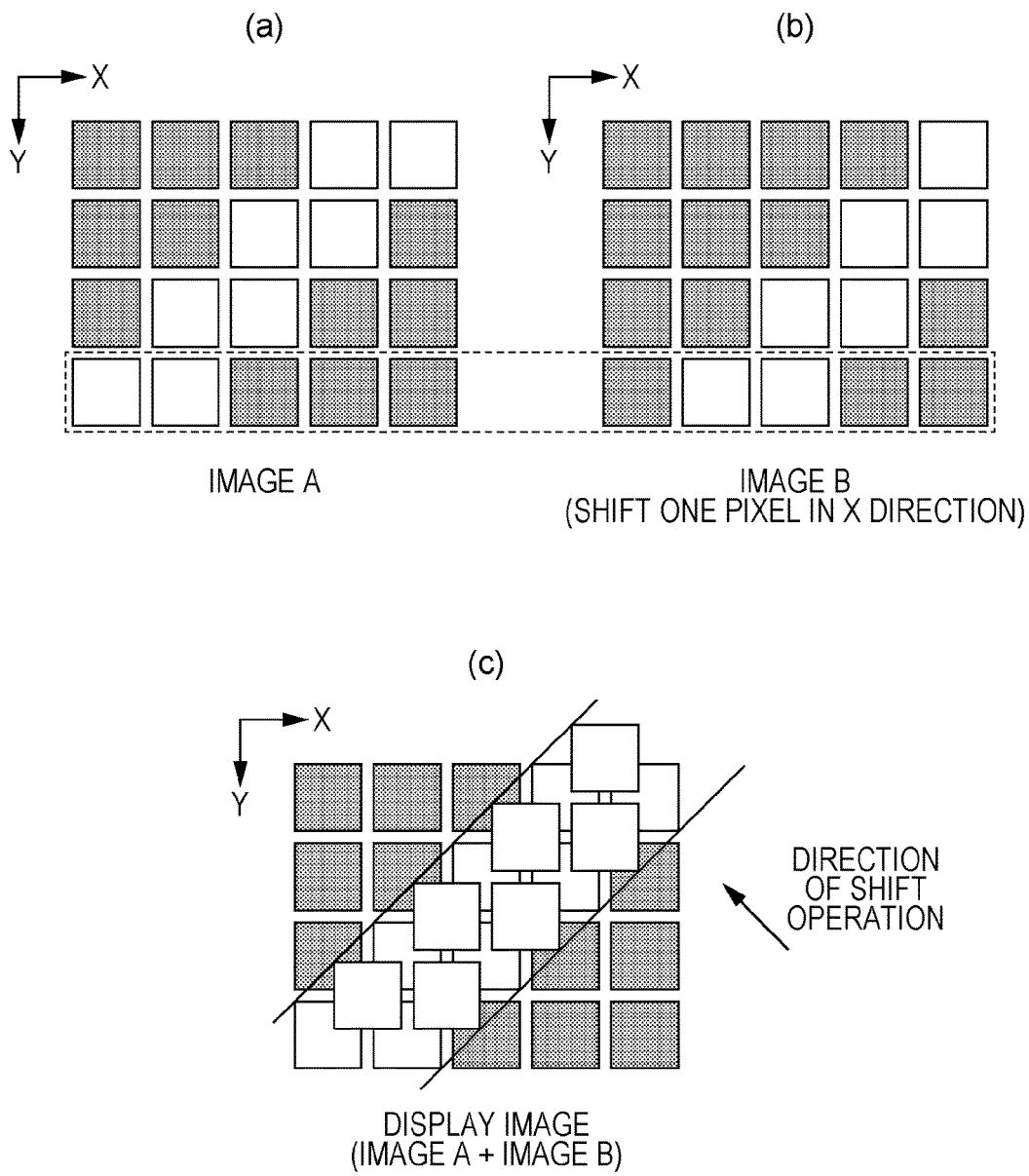

[Fig. 6]
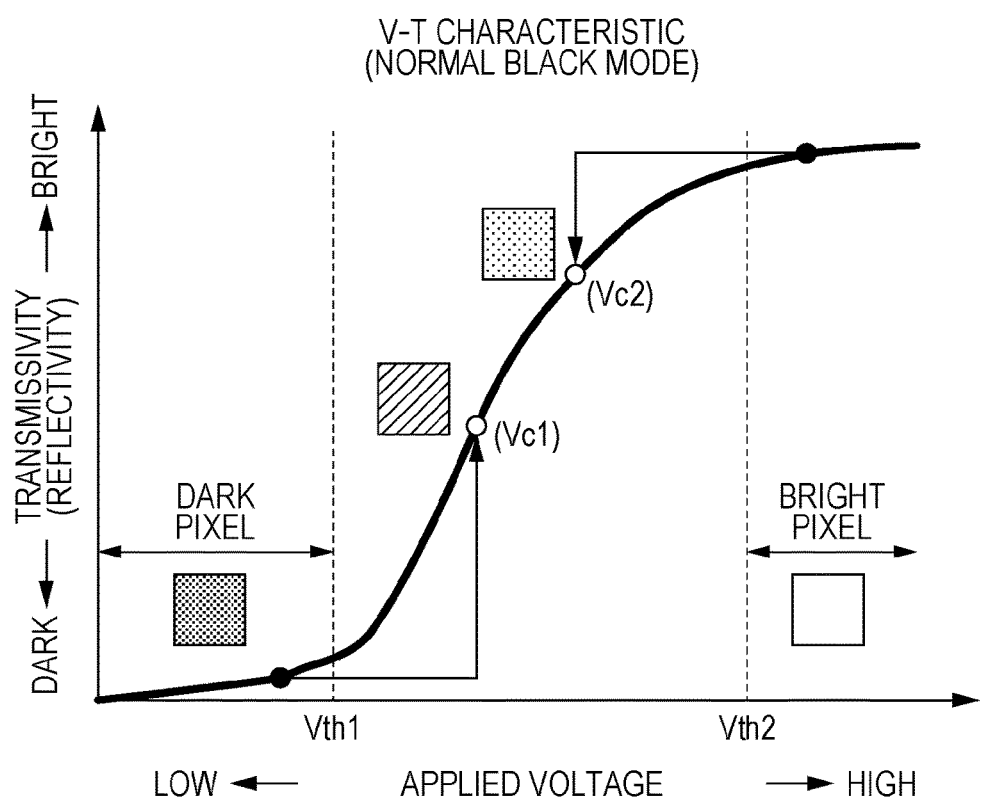

[Fig. 7]
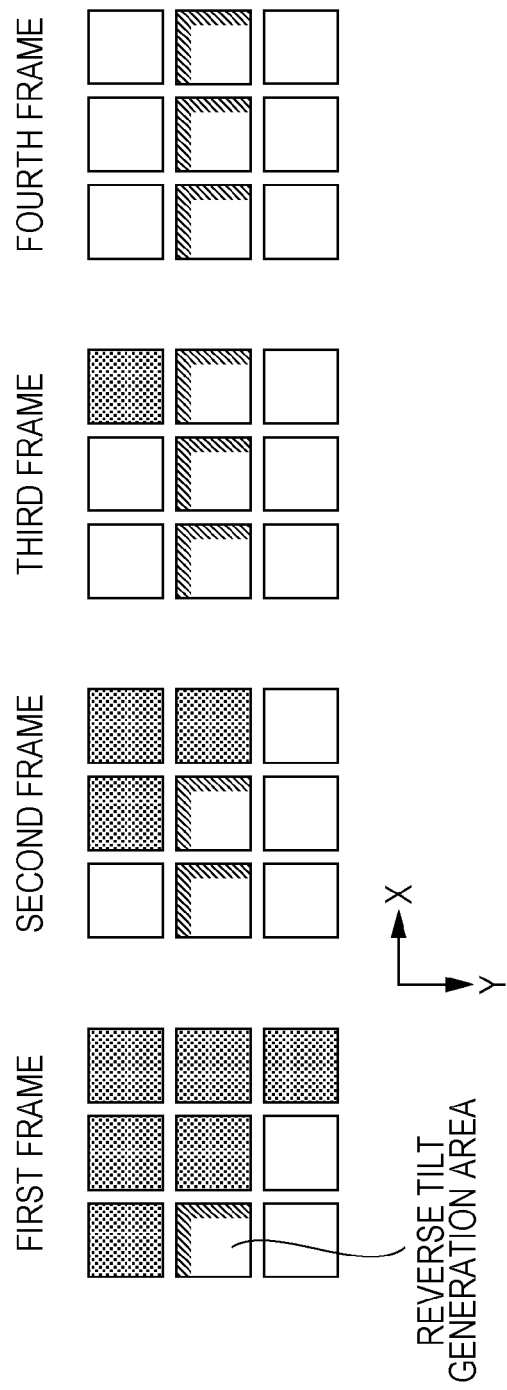

[Fig. 8]
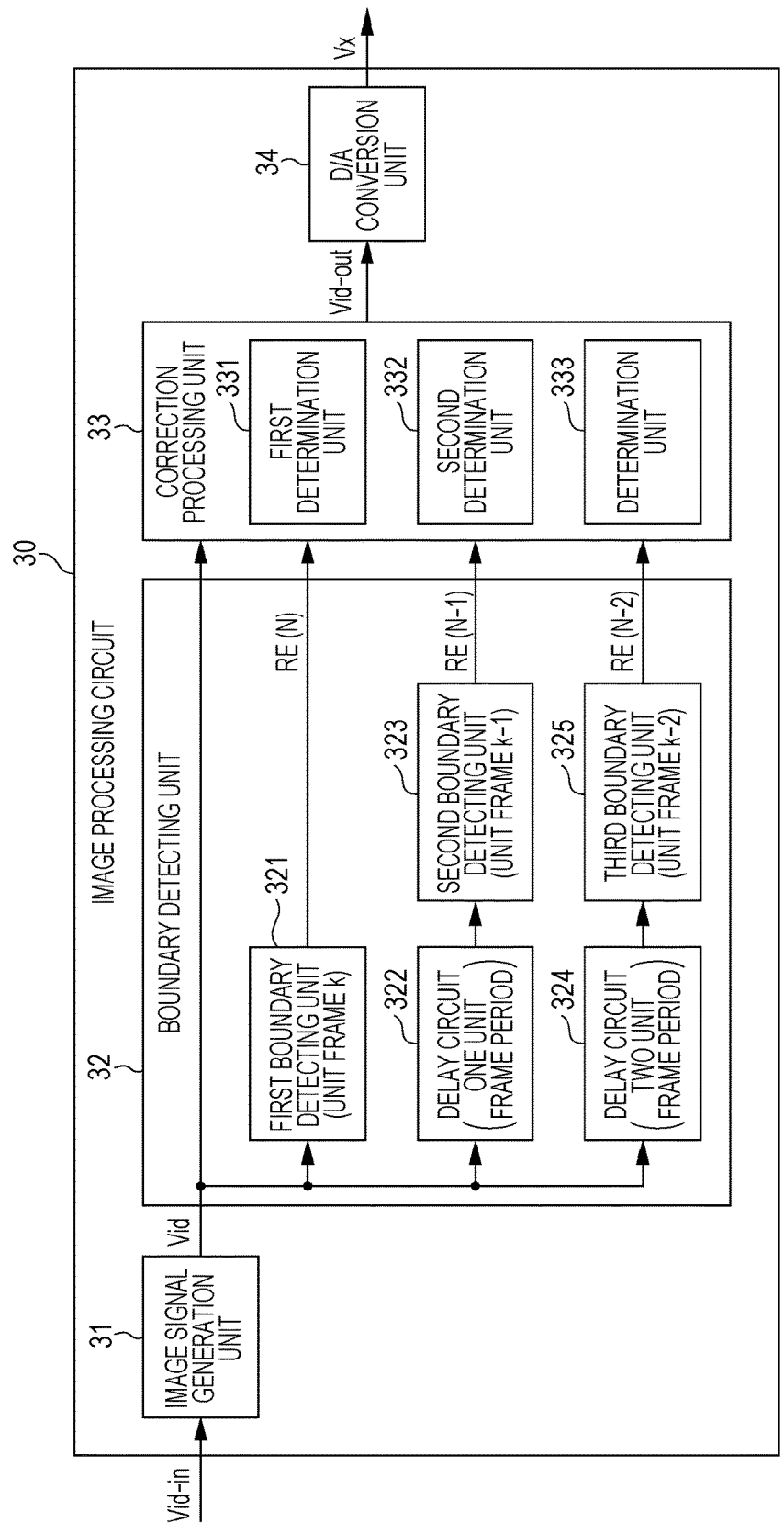

[Fig. 9]
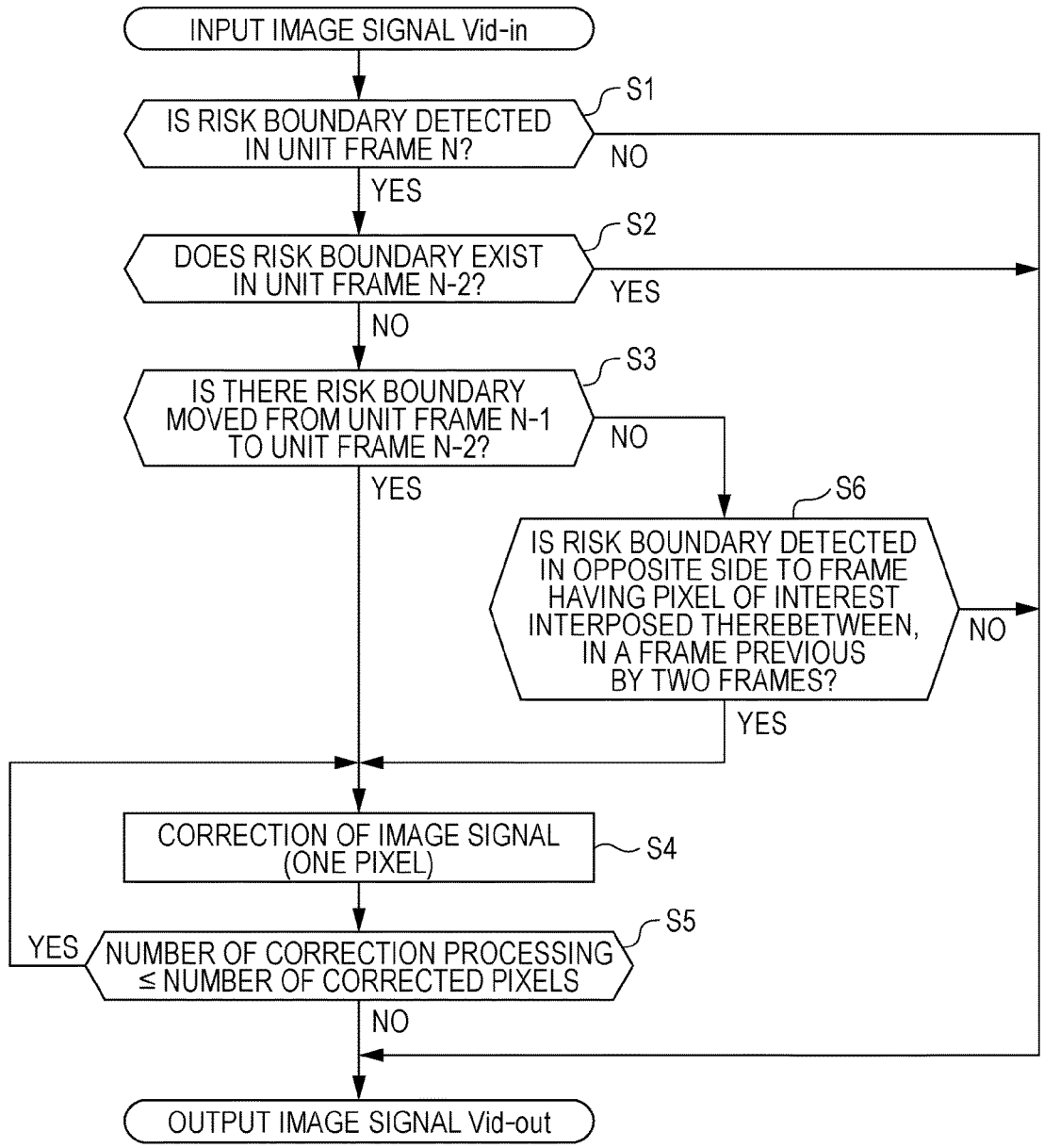

[Fig. 10A]
  ○ CASE OF STILL IMAGE
    IMAGE SIGNAL Vid
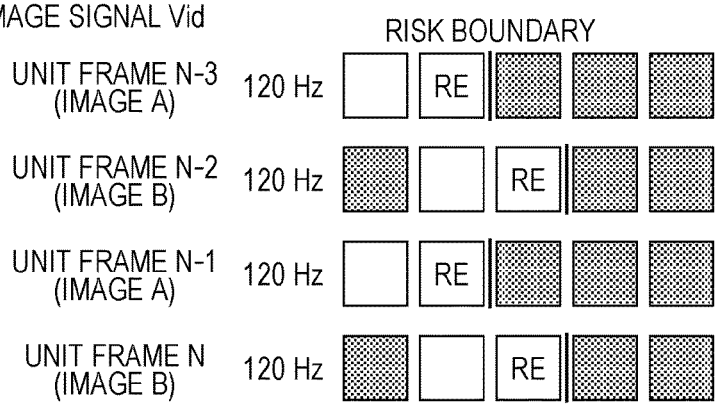
[Fig. 10B]
  ○ CASE OF STILL IMAGE
    OPERATION OF IMAGE PROCESSING CIRCUIT 30
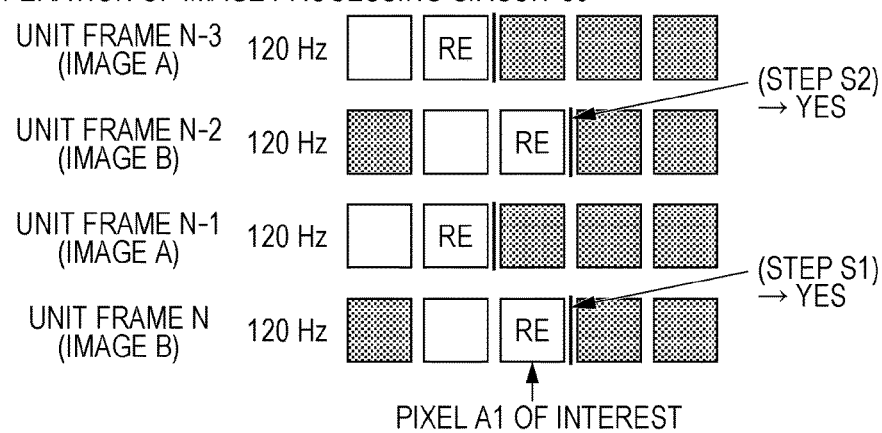
[Fig. 10C]
  ○ CASE OF STILL IMAGE
    OUTPUT IMAGE SIGNAL Vid-out
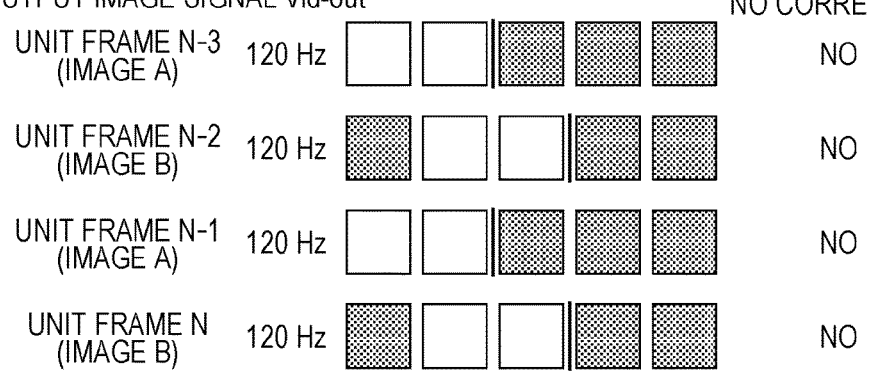

[Fig. 11A]
○ CASE OF STILL IMAGE
  IMAGE SIGNAL Vid
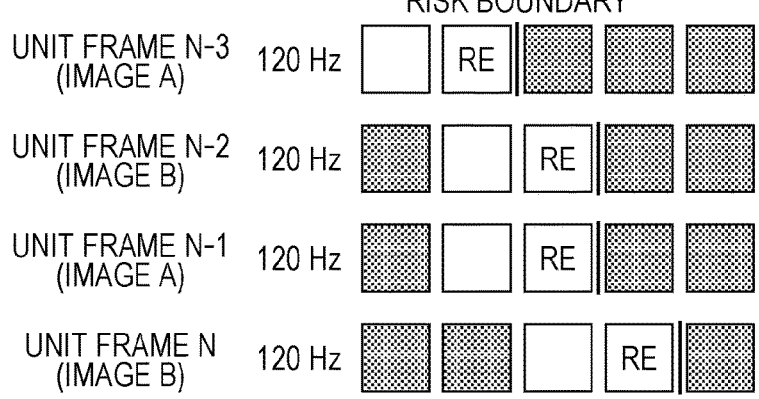
[Fig. 11B]
○ CASE OF STILL IMAGE
  OPERATION OF IMAGE PROCESSING CIRCUIT 30
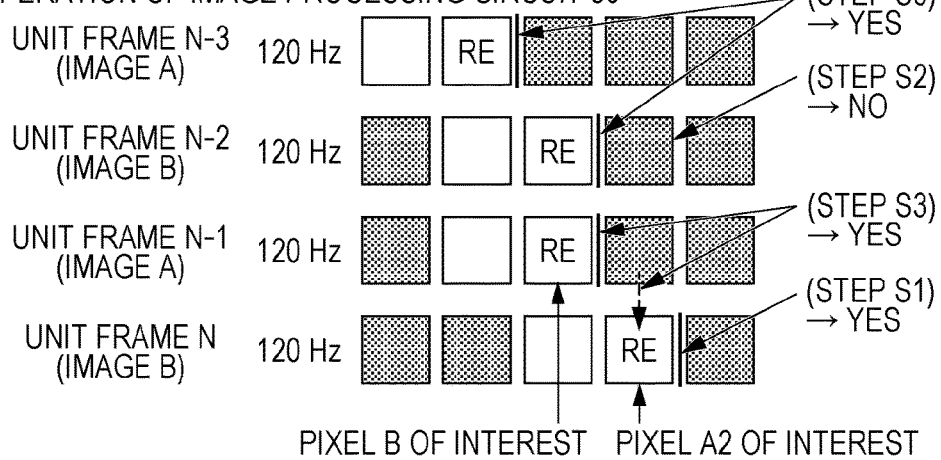
[Fig. 11C]
○ CASE OF STILL IMAGE
  OUTPUT IMAGE SIGNAL Vid-out
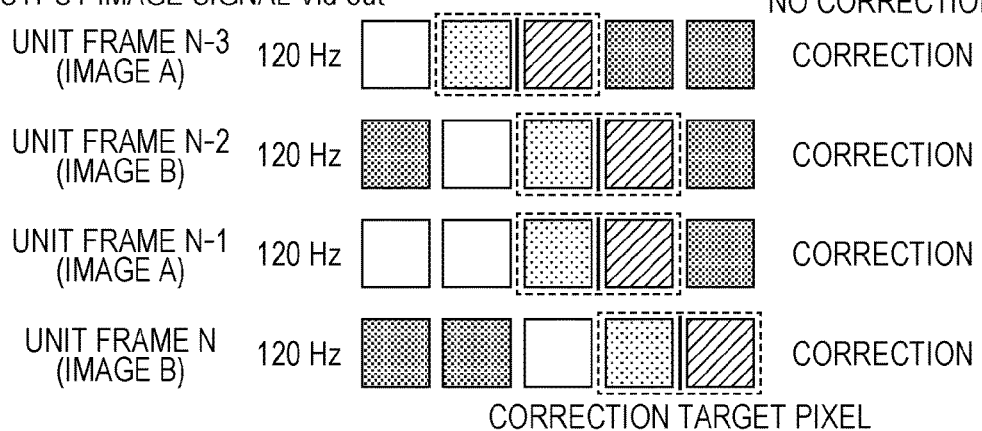

[Fig. 12A]
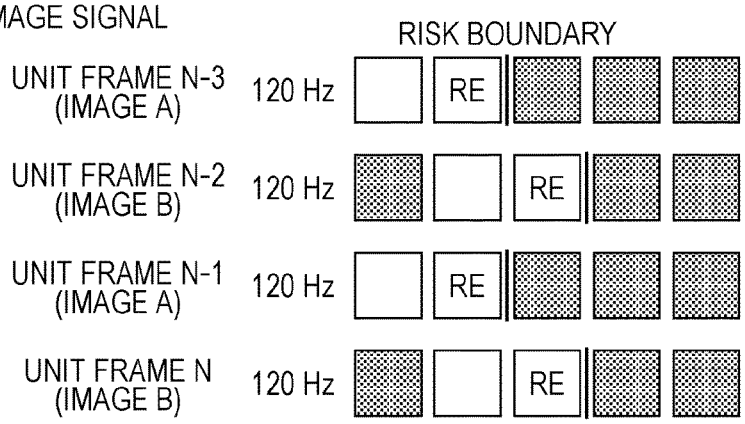
[Fig. 12B]
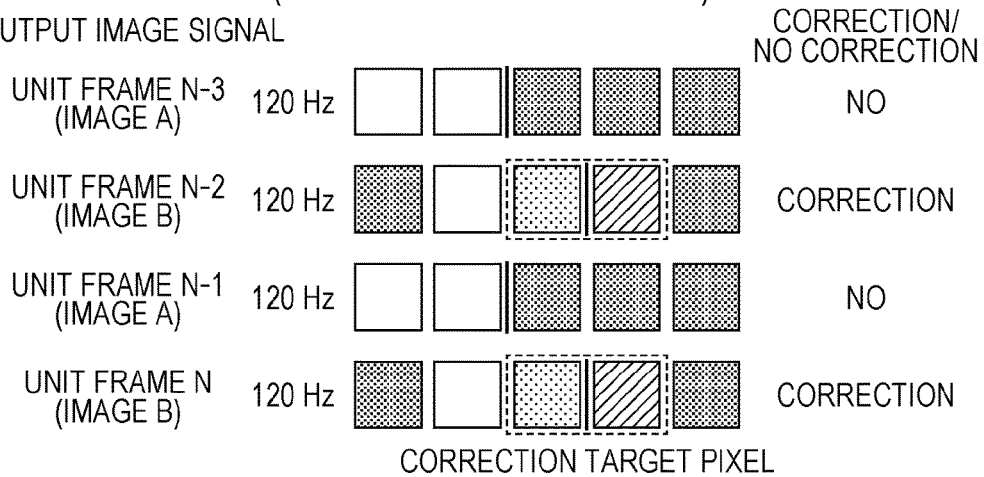

VIDEO PROCESSING CIRCUIT, VIDEO PROCESSING METHOD, ELECTRO-OPTICAL DEVICE, AND ELECTRONIC APPARATUS

TECHNICAL FIELD

The present invention relates to a technology of suppressing an occurrence of display trouble caused by liquid crystal alignment failure.

BACKGROUND ART

A liquid crystal panel is configured to include a liquid crystal interposed between a pixel electrode provided for each pixel and a common electrode provided in common in a plurality of pixels. In the liquid crystal panel, liquid crystal alignment failure (reverse tilt domain) caused by a transverse electric field occurring in pixel electrodes adjacent to each other occurs, and this causes an occurrence of display trouble. A technology of suppressing the occurrence of such a type of display trouble is disclosed in, for example PTL 1 to PTL 3. PTL 1 discloses a technology of correcting an application voltage designated to a dark pixel that is in contact with a portion changed from a boundary detected in a frame previous by one frame to a current frame, among boundaries between each of dark pixels and bright pixels that are detected in the current frame. PTL 2 discloses a technology of detecting a boundary between a dark pixel and a bright pixel, and replacing an application voltage to the dark pixel with a voltage Vc, when the application voltage to the dark pixel that is in contact with the detected boundary is lower than the voltage Vc. PTL 3 discloses a technology of detecting a boundary changed from a frame previous by one frame to a current frame to the current frame, in a boundary between a dark pixel and a bright pixel detected in the current frame, and of correcting an application voltage designated to a pixel in contact with the changed boundary differently in a one frame period and the other portions of the one frame period.

CITATION LIST

Patent Literature

PTL 1: JP-A-2011-53390
PTL 2: JP-A-2013-152483
PTL 3: JP-A-2013-156409

SUMMARY OF INVENTION

Technical Problem

However, there is a technology of increasing resolution in a pseudo manner by combining time-division drives of a shift device and a light valve, in a projector. For example, in the time-division drive of the light valve, an input video signal with one frame is divided into two video signals, each having one unit frame, and display positions of video are set different respectively in a first unit frame and a second unit frame. For this reason, even when a liquid crystal panel displays a still image, an application voltage that is designated to each pixel is changed for each unit frame. In this case, if a motion of video is detected and a correction target pixel is set using the technologies described in PTL 1 and PTL 3, a motion of video is detected even while displaying a still image, and as a result, the correction target pixel is increased. There is a case where display quality of a still image is decreased due to the increase of the correction target pixel. In the invention described in PTL 2, there is a case where, regardless of whether being a still image or a moving image, a pixel in contact with a boundary is a correction target pixel, and thus display quality of a still image is decreased.

Accordingly, it is an object of the present invention to suppress a decrease of display quality of a still image, when correction of suppressing a reverse tilt domain by detecting a motion of video is performed.

Solution to Problem

According to an aspect of the invention, a video processing circuit includes a boundary detection unit that detects a boundary between a first pixel to which an application voltage which is a first voltage is applied, and a second pixel to which an application voltage which is a second voltage higher than the first voltage is applied, based on a video signal which designates the application voltage for each pixel of a liquid crystal panel having a plurality of pixels and indicates a video which alternately switches between a first video and a second video which is obtained by moving in parallel with the first video for each unit frame; a first determination unit that determines whether or not a boundary detected by the boundary detection unit in a kth (k is a natural number) unit frame exists in a (k−2)th unit frame; a second determination unit that determines whether or not the boundary detected in the kth unit frame is a boundary which is moved from a (k−1)th unit frame to the kth unit frame; a correction unit that sets as a correction target pixel a pixel which is in contact with a boundary that is determined not to exist in the (k−2)th unit frame by the first determination unit and that is determined to have moved from the (k−1)th unit frame to the kth unit frame by the second determination unit, among the boundaries detected in the kth unit frame, and corrects the application voltage in such a manner that a fringe electric field occurring at the boundary is decreased; and an output unit that outputs a signal according to a video signal in which the application voltage is corrected by the correction unit, in such a manner that the liquid crystal panel is driven based on the signal.

According to the invention, among the boundaries detected in the kth unit frame, a pixel in contact with the boundary that is determined not to exist in the (k−2)th unit frame and that is determined to have moved from (k−1)th unit frame to the kth unit frame is set as a correction target pixel, and thus particularly, it is possible to suppress display quality of a still image from decreasing, when correction of suppressing a reverse tilt domain is performed by detecting a motion of a video.

In this case, the second determination unit may determine that, when the boundary detected in the kth unit frame is in contact with a pixel which is changed from the first pixel to the second pixel, from the (k−1)th unit frame to the kth unit frame, the boundary is the moved boundary.

According to the case, it is possible to determine the boundary that is moved from a (k−1)th unit frame to a kth unit frame by suppressing an increase of the amount of processing.

In this case, the second determination unit may determine that, when the boundary is in contact with the changed pixel, and the boundary is detected at opposite sides, between which the changed pixel is interposed, to the kth unit frame, in the (k−1)th unit frame, the boundary is the moved boundary.

According to the case, it is possible to accurately determine the boundary that is moved from a (k−1)th unit frame to a kth unit frame.

In this case, the correction unit may determine that a pixel which is in contact with the boundary that is not the moved boundary, among the boundaries detected in the kth unit frame, sets as the correction target pixel, when the boundary is detected at opposite sides, in which the pixel is interposed, to the (k−2)th unit frame.

According to the case, it is possible to suppress an occurrence of display trouble caused by a reverse tilt domain, in a pixel in contact with a boundary which is not the boundary that is moved from a (k−1)th unit frame to a kth unit frame.

In addition, the present invention can be used as a video processing method, an electro-optical device, and an electronic apparatus including the electro-optical device, in addition to the video processing circuit.

The electro-optical device may include an optical path shift unit that shifts an optical path of light modulated by the liquid crystal panel, and a shift control circuit that controls the optical path shift unit, according to a video signal which is used for driving the liquid crystal panel and displays any one of the first video and the second video.

According to the invention, even when resolution is increased in a pseudo manner by combining time-division drives of an optical path shift unit and a liquid crystal panel, it is possible to perform correction of suppressing a reverse tilt domain by detecting a motion of the video, and particularly to suppress a decrease of display quality of a still image.

BRIEF DESCRIPTION OF DRAWINGS

FIG. 1 is a plan view illustrating a configuration of a projector of an embodiment according to the invention.

FIG. 2 is a diagram illustrating an entire configuration of an electro-optical device included in the projector according to the same embodiment.

FIG. 3 is a diagram illustrating an equivalent circuit of a pixel included in a liquid crystal panel of the same electro-optical device.

FIG. 4 is an explanatory diagram of an operation of a control circuit of the same electro-optical device.

FIG. 5 is an explanatory diagram of a time-division drive of the same electro-optical device and control of a shift device.

FIG. 6 is a diagram illustrating V-T characteristics of a liquid crystal panel of the same electro-optical device.

FIG. 7 is an explanatory diagram of a reverse tilt domain occurring in a liquid crystal panel of the same electro-optical device.

FIG. 8 is a diagram illustrating a configuration of a video processing circuit of the same electro-optical device.

FIG. 9 is a flow chart illustrating a flow of video processing that is performed by the same electro-optical device.

FIG. 10A is an explanatory diagram of a specific example of video processing performed by the same electro-optical device (case of still image).

FIG. 10B is another explanatory diagram of a specific example of video processing performed by the same electro-optical device (case of still image).

FIG. 10C is still another explanatory diagram of a specific example of video processing performed by the same electro-optical device (case of still image).

FIG. 11A is an explanatory diagram of a specific example of video processing performed by the same electro-optical device (case of moving image).

FIG. 11B is another explanatory diagram of a specific example of video processing performed by the same electro-optical device (case of moving image).

FIG. 11C is still another explanatory diagram of a specific example of video processing performed by the same electro-optical device (case of moving image).

FIG. 12A is an explanatory diagram of a specific example of video processing according to a configuration of the related art.

FIG. 12B is another explanatory diagram of a specific example of video processing according to a configuration of the related art.

DESCRIPTION OF EMBODIMENT

Hereinafter, an embodiment according to the invention will be described with reference to the accompanying drawings.

FIG. 1 is a plan view illustrating a configuration of a projector 2100 of an embodiment according to the present embodiment. The projector 2100 is a liquid crystal projector (projection type display device) of a three-plate type. The projector 2100 forms images on liquid crystal panels 100R, 100G, and 100B that function as light valves, and thereby projects image light onto a reflection type screen 2120. The liquid crystal panel 100R is a liquid crystal panel that forms a red (R) image. The liquid crystal panel 100G is a liquid crystal panel that forms a green (G) image. The liquid crystal panel 100B is a liquid crystal panel that forms a blue (B) image. The projector 2100 receives signals with primary color components of each of R color, G color, and B color from an external higher-level circuit, respectively, and thereby the liquid crystal panels 100R, 100G and 100B are respectively driven.

As illustrated in FIG. 1, a lamp unit 2102 that is configured to have a white light source such as a halogen lamp is provided inside the projector 2100. A light source of the projector 2100 may be a solid-state light source, such as a light emitting diode (LED) or a semiconductor laser. Light emitted from the lamp unit 2102 is divided into three primary colors of R, G and B by three mirrors 2106 and two dichroic mirrors 2108, and the primary colors are guided to the liquid crystal panels 100R, 100G and 100B that correspond to each primary color, respectively.

In addition, the light of B has a long optical path, compared to the other light of R or G, and thus is guided via a relay lens system 2121 that is formed by an incident lens 2122, a relay lens 2123, and an emission lens 2124, in order to prevent loss.

The light that is respectively modulated by the liquid crystal panels 100R, 100G and 100B is incident on a dichroic prism 2112 from three directions. In the dichroic prism 2112, the light of R and the light of B are refracted at an angle of 90 degrees, and the light of G travels straight. If images with each primary color are synthesized in the dichroic prism 2112 and the synthesized image light is emitted, the emitted light is incident on the projection lens 2114 via the shift device 200. The shift device 200 is an element that moves in parallel (that is, shift) with the optical path of the incident light from the dichroic prism 2112 (an example of an optical shift unit). The shift device 200 is, for example, a liquid crystal layer, and a refractive index at the time of a first state where a voltage is not applied is different from a refractive index at the time of a second state where a voltage is applied. The projection lens 2114 projects a color image on the screen 2120, based on an image light that passes through the shift device 200.

In addition, light that corresponds to each of R, G and B is incident on the liquid crystal panels 100R, 100G and 100B by the dichroic mirror 2108, and thus a color filter may not be provided. In addition, while an image passing through the liquid crystal panels 100R and 100B is reflected by the dichroic prism 2112 and then projected, an image passing through the liquid crystal panel 100G is projected as it is. Thus, a horizontal scan direction by means of the liquid crystal panels 100R and 100B becomes an opposite direction to a horizontal scan direction by means of the liquid crystal panel 100G, and becomes a configuration in which an image obtained by inverting a left image with a right image is displayed.

The projector 2100 includes an electro-optical device 1 for performing a writing operation of a data signal with respect to the liquid crystal panels 100R, 100G and 100B, or for performing a shift operation of the optical path of the shift device 200. The configuration of each of the liquid crystal panel 100R, 100G and 100B, or an operation of the electro-optical device 1 for writing the data signal to the liquid crystal panel 100R, 100G and 100B is performed in common with respect to each color component of R, G and B. For this reason, in the following description, the liquid crystal panels 100R, 100G and 100B are not particularly separated, are collectively referred to as "liquid crystal panel 100", and the electro-optical device 1 will be described.

FIG. 2 is a diagram illustrating an entire configuration of the electro-optical device 1. As illustrated in FIG. 2, the electro-optical device 1 includes a control circuit 10, the liquid crystal panel 100, a scan line drive circuit 130, and a data line drive circuit 140.

An input video signal Vid-in is synchronized with a synchronization signal Sync and the synchronized signal is input to the control circuit 10. The input video signal Vid-in is digital data that designates an application voltage for each pixel 110 which is included in the liquid crystal panel 100. The input video signals Vid-in are supplied in the sequence of scanning, according to a vertical scan signal, a horizontal scan signal, and a dot clock signal (all signals are not illustrated) that are included in the synchronization signal Sync.

For example, the input video signal Vid-in is a signal that is obtained by converting a gradation signal indicating a gradation value of each pixel supplied to the electro-optical device 1 from a higher-level device. For example, the electro-optical device 1 performs predetermined processing such as gamma correction with respect to the gradation signal, by a processing circuit that is not illustrated, and thereafter converts the signal into the input video signal Vid-in using a table that converts the gradation value to a voltage value. However, when an application voltage designated to the pixel is specifically set according to the gradation value, the input video signal Vid-in may be a signal that designates the gradation value of each pixel.

The control circuit 10 includes a scan control circuit 20, a video processing circuit 30, and a shift control circuit 40. The scan control circuit 20 generates various control signals and controls each unit of the electro-optical device 1, in synchronization with the synchronization signal Sync. The video processing circuit 30 performs predetermined video processing with respect to the input video signal Vid-in, and outputs a data signal Vx. The data signal Vx is analog data that designates the application voltage for each pixel 110 of the liquid crystal panel 100. The shift control circuit 40 controls the shift device 200 in synchronization with the drive of the liquid crystal panel 100.

The liquid crystal panel 100 is configured to include an element substrate 100a and a counter substrate 100b that are bonded to each other with a constant interval therebetween, and a liquid crystal 105 that is driven by an electric field in a vertical direction and interposed therebetween. On a surface, which faces the counter substrate 100b, of the element substrate 100a, while m rows of scan lines 112 are provided along an X (horizontal) direction in FIG. 2, n columns of data lines 114 are provided along a Y (vertical) direction in FIG. 2, and are provided so as to be electrically insulated to each scan line 112.

In addition, in this embodiment, there is a case to call the rows a first row, a second row, a third row, . . . , an mth row, sequentially from the top in FIG. 2, in order to distinguish the scan lines 112. In the same manner, there is a case to call the columns a first column, a second column, a third column, a fourth column, a fifth column, a sixth column, . . . , an (n−1)th column, an nth column, sequentially from the left in FIG. 2, in order to distinguish the data lines 114.

The element substrate 100a provides a set of an n channel type TFT 116 and a pixel electrode 118 with a rectangular shape and transparency, in correspondence to each of the intersections of the scan lines 112 and the data lines 114. A gate electrode of the TFT 116 is connected to the scan line 112, a source electrode is connected to the data line 114, and a drain electrode is connected to the pixel electrode 118.

Meanwhile, a common electrode 108 with transparency is provided over an entire surface, which faces the element substrate 100a, of the counter substrate 100b. A voltage LCcom is applied to the common electrode 108 by a circuit that is not illustrated in FIG. 2.

In addition, in FIG. 2, the surface facing the element substrate 100a is a back side, and thus the scan line 112, the data line 114, the TFT 116, and the pixel electrode 118 that are provided on the surface have to be illustrated as hidden lines (dashed lines), but since it is difficult to see the lines, the lines are respectively illustrated as a solid line.

FIG. 3 is a diagram illustrating an equivalent circuit of the liquid crystal panel 100.

As illustrated in FIG. 3, the liquid crystal panel 100 includes a pixel 110. The pixel 110 includes a liquid crystal 120 having the liquid crystal 105 that is interposed between the pixel electrode 118 and the common electrode 108, in correspondence to the intersection of the scan line 112 and the data line 114. In the pixel 110, a molecule alignment state of the liquid crystal 105 is changed depending on an electric field that is generated by the pixel electrode 118 and the common electrode 108. For this reason, if the pixel is a transmission type, transmissivity of the pixel 110 (liquid crystal element 120) depends on an application voltage and a holding voltage. In addition, the transmissivity of the liquid crystal panel 100 is changed for each pixel 110.

As illustrated in FIG. 3, an auxiliary capacitor (storage capacitor) 125, which is not illustrated in FIG. 2, is actually provided in parallel to each of the pixels 110. One end of the auxiliary capacitor 125 is connected to the pixel electrode 118, and the other end thereof is connected in common to a capacitor line 115. The capacitor line 115 is maintained temporally at a constant voltage.

Here, if the scan line 112 becomes an H level, the TFT 116, the gate electrode of which is connected to the scan line 112, turns on, and the pixel electrode 118 is connected to the data line 114. For this reason, when the scan line 112 becomes an H level, if a data signal with a voltage according to the data signal Vx is supplied to the data line 114, the data signal is applied to the pixel electrode 118 via the TFT 116 that is turned on. If the scan line 112 becomes an L level, the TFT 116 turns off, but the voltage applied to the pixel electrode 118 is retained by the capacitor of the pixel 110, and is retained in the auxiliary capacitor 125 connected in parallel to the pixel 110.

In addition, in the present embodiment, the liquid crystal 105 is set as a vertical alignment (VA), and each of the pixels 110 is set as a normal black mode that is in a black state when a voltage is not applied.

The description returns to FIG. 2.

The scan line drive circuit 130 supplies scan signals Y1, Y2, Y3, . . . , Ym to the first row scan line 112, the second row scan line 112, the third row scan line 112, . . . , the mth row scan line 112, according to a control signal Yctr generated by the scan control circuit 20. In detail, the scan line drive circuit 130 selects the scan lines 112 in a sequence of the first row, the second row, the third row, . . . , mth row, sets the scan signal to the selected scan line 112 as a selection voltage $V_H$ (H level), and the other scan signals to the scan lines 112 as a non-selection voltage $V_L$ (L level).

Here, one frame is a period required for displaying an amount of one coma by driving the liquid crystal panel 100, and 16.7 ms which is a reciprocal number thereof, if a frequency of the vertical scan signal included in the synchronization signal Sync is 60 Hz. The input video signal Vid-in of one frame designates an application voltage of m×n pixels that are m pixels in a Y direction and n pixels in an X direction. m is equal to the number of the pixels 110 arranged in the Y direction in the liquid crystal panel 100. n is equal to the number of the pixels 110 arranged in the X direction in the liquid crystal panel 100.

The data line drive circuit 140 samples the data signal Vx that is supplied from the video processing circuit 30 to the data lines 114 of the first row, the second row, the third row, the fourth row, the fifth row, the sixth row, . . . , the (n−1)th row, and the nth row, according to a control signal Xctr generated by the scan control circuit 20, as data signals of X1, X2, X3, X4, X5, X6, . . . , Xn−1, and Xn.

The scan line drive circuit 130 and the data line drive circuit 140 that are configured as described above configure a drive circuit (drive unit) that drives the liquid crystal panel 100 in a sequence of lines.

In addition, in the present embodiment, a ground voltage that is not illustrated is set as a reference voltage of zero with regard to a voltage, except for the application voltage of the pixel 110, unless particularly stated elsewhere. The application voltage of the pixel 110 is a voltage difference between the voltage LCcom of the common electrode 108 and the voltage of the pixel electrode 118, and is distinguished from other voltages.

FIG. 4 is a diagram for explaining an operation of the control circuit 10.

In the present embodiment, the frequency of the vertical scan signal of the liquid crystal panel 100 that is controlled by the synchronization signal Sync is 240 Hz. As illustrated in FIG. 4, the control circuit 10 divides one frame into four sub-frames of a first sub-frame (field) to fourth sub-frame, and during each sub-frame that is divided, the first scan line to the mth scan line are scanned, that is, a so-called four-fold speed drive is realized. That is, based on the input video signal Vid-in that is supplied from a higher-level device at a supplying speed of 60 Hz, the control circuit 10 drives the liquid crystal panel 100 at a drive speed of 240 Hz. A period of one sub-frame corresponds to a period of a ¼ frame, and here, it is approximately 4.16 ms.

With regard to a writing polarity, the control circuit 10 designates positive polarity writing (+) in the first sub-frame and the third sub-frame, and designates negative polarity writing (−) in the second sub-frame and the fourth sub-frame. That is, the control circuit 10 inverts a writing polarity for each sub-frame, and performs writing the data signal to the pixel 110. In addition, based on the input video signal Vid-in of one frame, the control circuit 10 generates one video signal Vid that indicates a first image (hereinafter, referred to as "image A") that is displayed in the first sub-frame and the second sub-frame, and another video signal Vid that indicates a second image (hereinafter, referred to as "image B") that is displayed in the third sub-frame and the fourth sub-frame. Based on the video signal Vid, the control circuit 10 performs a time-division drive for alternately displaying the image A and the image B on the liquid crystal panel 100. The image A is the same as an image that the input video signal Vid-in indicates. The image B is an image that is obtained by moving in parallel (that is shifted) with the image A, and here, it is an image that is obtained by moving the image A by one pixel size in the X direction. The video signal Vid indicates an image in which the image A and the image B are alternately switched for each frame using two sub-frames as a unit frame (unit period). For this reason, the unit frame is switched in a period of 120 Hz.

A shift operation using the shift device 200 will be described. The shift control circuit 40 sets the shift device 200 to a first state during the first sub-frame and the second sub-frame that display the image A, and sets the shift device 200 to a second state during the third sub-frame and the fourth sub-frame that display the image B. Here, the shift control circuit 40 controls the shift device 200 in such a manner that an optical path of image light is shifted by ½ pixel size in an opposite direction to the X direction, and by ½ pixel size in an opposite direction to the Y direction, in the third sub-frame and the fourth sub-frame.

The time-division operation of the liquid crystal panel 100 and the shift operation using the shift device 200 are performed for increasing resolution of an image in a pseudo manner, in the projector 2100. Here, as illustrated in FIG. 5(a), a case is considered where the image A is an image in which an oblique line formed of bright pixels that display a relatively bright color is disposed on a background formed of dark pixels that display a relatively dark color. In this case, the image B becomes an image illustrated in FIG. 5(b). In the liquid crystal panel 100, when the image A and the image B are alternately displayed, an edge of the oblique line is smoothened, as illustrated in FIG. 5(c), and the resolution of an image is increased in a pseudo manner.

FIG. 6 is a graph illustrating a relationship (V-T characteristic) between an application voltage to the pixel 110 and transmissivity of the pixel 110. In the graph illustrated in FIG. 6, a horizontal axis denotes a magnitude of the application voltage designated to the pixel 110, and a vertical axis denotes a magnitude of the transmissivity (specifically, relative transmissivity) of the pixel 110.

In the liquid crystal panel 100, when a voltage designated by the input video signal Vid-in is applied to the pixel 110 as it is, a reverse tilt domain may occur depending on an application voltage difference between two pixels 110 adjacent to each other. In general, as the application voltage difference increases, the reverse tilt domain can easily occur near a boundary between the two pixels 110 adjacent to each other. In a case of a normal black mode, when the pixel 110 indicating a bright pixel is adjacent to the pixel 110 indicating a dark pixel, the reverse tilt domain occurs at an area near a boundary of the pixel 110 that is a bright pixel. In the present embodiment, the dark pixel and the bright pixel will be specified as follows. The dark pixel is the pixel 110 in which an application voltage is less than a first threshold voltage Vth1 that is a voltage with a dark level in the normal black mode. The bright pixel is the pixel 110 in which an application voltage exceeds a second threshold voltage Vth2 (however, Vth2>Vth1) that is a voltage with a white level in the normal black mode. For example, Vth1 is an optical threshold voltage in which relative transmissivity of a liquid crystal element is set to 10%. For example, Vth2 is an optical saturation voltage in which relative transmissivity of a liquid crystal element is set to 90%. However, values of Vth1 and Vth2 may be voltages corresponding to other relative transmissivity.

Here, as illustrated in FIG. 7, a case is considered where a bright pixel moves in an X direction by one pixel per one frame in a sequence of the first frame, the second frame, the third frame, and the fourth frame, by using dark pixels as a background. In this case, a pixel to be changed to a bright pixel from a dark pixel depending on a motion of an image does not become an original gradation by an occurrence of the reverse tilt domain. As a result, reverse tilt occurrence areas of a plurality of bright pixels are connected to each other, and manifested as a kind of tailing phenomenon.

Thus, in order to suppress display trouble caused by the reverse tilt domain, when a pixel that is changed from a dark pixel to a bright pixel is in contact with a boundary, the application voltage designated by the input video signal Vid-in may be corrected so as to decrease a fringe electric field (a transverse electric field) occurring at the boundary.

When a dark pixel is adjacent to a bright pixel, based on the input video signal Vid-in, the video processing circuit 30 of the electro-optical device 1 detects a boundary between the dark pixel and the bright pixel, and performs video processing for correcting the application voltage designated to the pixel 110 in contact with the boundary.

FIG. 8 is a block diagram illustrating a configuration of the video processing circuit 30. As illustrated in FIG. 8, the video processing circuit 30 includes a video signal generation unit 31, a boundary detection unit 32, a correction processing unit 33, and a D/A conversion unit 34.

Based on the input video signal Vid-in, the video signal generation unit 31 generates a video signal Vid indicating the image A that is displayed in the first sub-frame and the second sub-frame of the first frame, and another video signal Vid indicating the image B that is displayed in the third sub-frame and the fourth sub-frame.

Based on the video signal Vid generated by the video signal generation unit 31, the boundary detection unit 32 detects a boundary between a dark pixel and a bright pixel as a risk boundary. The boundary detection unit 32 includes in detail a first boundary detection unit 321, a delay circuit 322, a second boundary detection unit 323, a delay circuit 324, and a third boundary detection unit 325.

Based on the video signal Vid of a kth unit frame that is a kth (k is a natural number) unit frame, the first boundary detection unit 321 detects a risk boundary. The first boundary detection unit 321 outputs positional information RE (k) indicating a position of the boundary detected in the kth unit frame to the correction processing unit 33.

The delay circuit 322 delays the video signal Vid by one unit frame period (here, 8.34 ms that is a two-sub-frame period), and outputs the signal to the second boundary detection unit 323. For this reason, based on the video signal Vid of a (k−1)th unit frame that is a (k−1)th unit frame, the second boundary detection unit 323 detects a risk boundary.

The second boundary detection unit 323 outputs positional information RE (k−1) indicating a position of the risk boundary detected in the (k−1)th unit frame to the correction processing unit 33.

The delay circuit 324 delays the video signal Vid that is input by a two-unit frame period (here, 16.67 ms that is a four-sub-frame period), and outputs the signal to the third boundary detection unit 325. For this reason, based on the video signal Vid of a (k−2)th unit frame that is a (k−2)th unit frame, the third boundary detection unit 325 detects a risk boundary. The third boundary detection unit 325 outputs positional information RE (k−2) indicating a position of the risk boundary detected in the (k−2)th unit frame to the correction processing unit 33.

In addition, accumulation and reading of the delay circuits 322 and 324 are controlled by the scan control circuit 20.

The correction processing unit 33 performs correction processing with respect to the video signal Vid supplied from the video signal generation unit 31, and outputs the corrected signal as an output video signal Vid-out. The correction processing unit 33 specifically includes a first determination unit 331, a second determination unit 332, and a correction unit 333.

The first determination unit 331 determines whether or not the risk boundary detected by the first boundary detection unit 321 in the kth unit frame exists in the (k−2)th unit frame. Based on the positional information RE (k) and the positional information RE (k−2), the first determination unit 331 determines whether to detect the risk boundary at the same position or not.

The second determination unit 332 determines whether or not the risk boundary detected in the kth unit frame is a risk boundary that is moved from the (k−1)th unit frame to the kth unit frame. Here, the second determination unit 332 performs determination processing formed of the following (determination I) and (determination II). (determination I) whether or not the risk boundary detected in the kth unit frame is in contact with a pixel that is changed from a dark pixel to a bright pixel over the kth unit frame from the (k−1)th unit frame. (determination II) whether or not the risk boundary is detected in an opposite side to the kth unit frame in which the changed pixel is interposed therebetween, in the (k−1)th unit frame.

When two determination results of (determination I) and (determination II) are "YES", the second determination unit 332 determines that the risk boundary is a risk boundary that is moved from the (k−1)th unit frame to the kth unit frame.

In addition, in (determination I), the second determination unit 332 makes a determination based on the video signal Vid with a (k−1)th unit frame, and the video signal Vid with the kth unit frame. In (determination II), the second determination unit 332 makes a determination based on the positional information RE (k−1) and the positional information RE (k).

Among the risk boundaries detected in the kth unit frame, the correction unit 333 sets as a correction target pixel the pixel which is in contact with the risk boundary that the first determination unit 331 determines that the risk boundary does not exist in the (k−2)th unit frame and the second determination unit 332 determines that the risk boundary is moved from the (k−1)th unit frame to the kth unit frame. Then, the correction unit 333 corrects the video signal Vid of a correction target pixel so as to decrease the fringe electric field (the transverse electric field) occurring at the risk boundary, and sets the video signal as the output video signal Vid-out. For example, the correction target pixel includes at least one of the dark pixel and the bright pixel that are in contact with the risk boundary, but may include many more pixels. When the dark pixel is set as a correction target pixel, the correction unit 333 corrects the application voltage designated by the video signal Vid so as to be increased, and for example, the application voltage Vc1 illustrated in FIG. 6 is corrected by the video signal. When the bright pixel is set as a correction target pixel, the correction unit 333 corrects the application voltage designated by the video signal Vid so as to be decreased, and for example, the application voltage Vc2 illustrated in FIG. 6 is corrected by the designated video signal (however, Vc2>Vc1).

In addition, for example, based on a look-up table or an arithmetic expression that designates a relationship between the application voltages after the correction, the correction unit 333 may correct the video signal Vid. In addition, the correction unit 333 does not correct the video signal Vid in the whole of one frame, but may correct only at a partial period of one frame, and may correct another application voltage at a partial period and another period of the one frame based on a designated video signal.

The D/A conversion unit 34 converts the output video signal Vid-out that is a digital signal to an analog data signal Vx and outputs the converted signal (an example of output unit). Based on the output video signal Vid-out, the D/A conversion unit 34 outputs the data signal Vx to the liquid crystal panel 100. That is, the D/A conversion unit 34 outputs the data signal Vx to the data line drive circuit 140 so as to drive the liquid crystal panel 100 based on the video signal corrected by the correction processing unit 33 (correction unit 333).

In addition, in order to prevent direct current components from being applied to the liquid crystal 105, a voltage of the data signal Vx is switched to a positive polarity voltage of a high potential side and a negative polarity voltage of a low potential side, that is, alternately switched for each subframe, with respect to the voltage Vcnt that is a video amplitude center.

In addition, the voltage LCcom that is applied to the common electrode 108 is approximately equal to the voltage Vcnt, but may be adjusted to be a lower voltage than the voltage Vcnt, by considering off-leakage of the n channel type TFT 116 or the like.

FIG. 9 is a flowchart illustrating a flow of video processing performed by the video processing circuit 30. The video processing circuit 30 performs processing illustrated in FIG. 9 by paying attention to one pixel in which an application voltage is designated to the input video signal Vid-in. Hereinafter, by referring to FIG. 9, an operation example of the video processing circuit 30 when the video that the input video signal Vid-in indicates is a still image, and an operation example of the video processing circuit 30 when the video that the input video signal Vid-in indicates is a moving image will be respectively described.

Operation Example 1: A Case where the Video that the Input Video Signal Vid-in Indicates is a Still Image When the video that the input video signal Vid-in indicates is a still image, FIG. 10A is a diagram for explaining the video signal Vid, FIG. 10B is a diagram for explaining an operation of the video processing circuit 30, and FIG. 10C is a diagram for explaining the output video signal Vid-out. Here, an example of video processing based on the video signal Vid illustrated so as to be surrounded by dashed lines in FIG. 5(a) and FIG. 5(b) will be described.

Based on the video signal Vid, the video processing circuit 30 first determines whether or not the risk boundary in contact with a pixel of interest is detected in the unit frame N (N is a natural number) (step S1). Here, it is considered that the video signal Vid from the unit frame N−3 to the unit frame N illustrated in FIG. 10A is generated by the video signal generation unit 31. In this case, when a pixel to which a character string that is called RE is attached becomes the pixel of interest, the video processing circuit 30 detects the risk boundary in contact with the pixel of interest. Here, when the pixel A1 of interest illustrated in FIG. 10B is specified, the video processing circuit 30 determines that the result of the processing of step S1 is "YES".

Next, the video processing circuit 30 determines whether or not the risk boundary detected in the unit frame N exists in the unit frame N−2 (step S2). As explained using FIGS. 4 and 5, when the input video signal Vid-in is a still image, the same image A is displayed in the unit frame N−2 and the unit frame N. For this reason, in the unit frame N−2 and the unit frame N, the application voltages designated to each pixel become equal to each other, and the positions at which the risk boundaries are detected become the same as each other. Thus, while displaying the still image, the video processing circuit 30 determines "YES" in the processing of step S2. When "YES" is determined in the processing of step S2, the video processing circuit 30 does not correct the video signal Vid, sets the video signal Vid as the output video signal Vid-out, converts the signal into the data signal Vx, and outputs the converted data signal.

As illustrated in FIG. 10C, the video processing circuit 30 sets the video signal Vid as the output video signal Vid-out, converts the signal into the data signal Vx, and outputs the converted data signal, with respect to not only the video signal Vid with the unit frame N, but also the video signals Vid with the unit frame N−3, the unit frame N−2, and the unit frame N−1. For this reason, while displaying the still image, even when the time-division drive of the liquid crystal panel 100 according to pseudo high resolution is performed, the video processing circuit 30 sets the video signal Vid as the output video signal Vid-out.

FIG. 12A and FIG. 12B are diagrams illustrating a specific example of video processing of determining a correction target pixel by detecting a motion of an image according to a configuration of the related art. As illustrated in FIG. 12A and FIG. 12B, in the configuration of the related art, the correction target pixel is determined by comparing a video signal with a frame previous by one frame to a current frame and a video signal with the current frame. For this reason, when the time-division drive of the liquid crystal panel according to the pseudo high resolution is performed, even while displaying a still image, a motion of an image is detected. Thus, even if a correction of suppressing the reverse tilt domain only when displaying the moving image is performed, the correction is performed even when displaying the still image. For example, when the video signal indicating the still image is a video signal illustrated in FIG. 12A, the video signal of a pixel in contact with the risk boundary is corrected and becomes the output video signal, as illustrated in FIG. 12B. As a result, there is a case where the correction target pixels are increased, and thereby display quality of the still image is noticeably decreased. In contrast to this, according to the present operation example 1, as illustrated in FIG. 10A to FIG. 10C, there is no correction target pixel when displaying the still image, and thus the display quality is not decreased.

Operation Example 2: When the Video that the
Input Video Signal Vid-in Indicates is a Moving
Image When the video that the input video signal Vid-in indicates is a moving image, FIG. 11A is a diagram for explaining the video signal Vid, FIG. 11B is a diagram for explaining an operation of the video processing circuit 30, and FIG. 11C is a diagram for explaining the output video signal Vid-out. Here, as illustrated in FIG. 7, a case where the bright pixel moves by one pixel per one frame in the X direction by using the dark pixel as a background will be described.

Based on the video signal Vid, the video processing circuit 30 first determines whether or not the risk boundary in contact with a pixel of interest is detected in the unit frame N (N is a natural number) (step S1). Here, it is considered that the video signal Vid with the unit frame N−3 to the unit frame N illustrated in FIG. 11A is generated by the video signal generation unit 31. When the pixel A2 of interest illustrated in FIG. 11B is specified, the video processing circuit 30 determines that the result of the processing of step S1 is "YES".

Next, the video processing circuit 30 determines whether or not the risk boundary detected in the unit frame N exists in the unit frame N−2 (step S2). When displaying the moving image, the video signal Vid indicates video shifted by one pixel in the X direction in the unit frame N−2 and the unit frame N. For this reason, as illustrated in FIG. 11B, the risk boundary detected in the unit frame N does not exist in the unit frame N−2. Thus, the video processing circuit 30 determines that the result of the processing of step S2 is "NO".

Next, the video processing circuit 30 determines whether or not the risk boundary detected in the video signal Vid with the unit frame N is a risk boundary that is moved from the unit frame N−1 (step S3) to the unit frame N. The video processing circuit 30 performs determination processing of (determination I) and (determination II) that are described above, and detects the risk boundary that is moved by one pixel from the unit frame N−1 to the unit frame N. Here, as illustrated in FIG. 11B, the pixel A2 of interest is changed to the bright pixel from the dark pixel, from the unit frame N−1 to the unit frame N, and thus the requirements of (determination I) are satisfied. Furthermore, in the unit frame N−1, the risk boundary is detected at an opposite side to the unit frames N between which the pixel A2 of interest is interposed. For this reason, the requirements of (determination II) are satisfied. Thus, the video processing circuit 30 determines that the result of the processing of step S3 is "YES".

In addition, when the pixel of interest is changed to the dark pixel from the bright pixel or the video moves by two pixels or more per one frame, the video processing circuit 30 determines that the result of processing of step S3 is "NO". In this case, the video processing circuit 30 sets the video signal Vid as the output video signal Vid-out, converts the signal into the data signal Vx, and outputs the converted data signal.

When the result of the processing of step S3 is determined to be "YES", the video processing circuit 30 determines a correction target pixel and corrects the video signal Vid, based on the pixel of interest in contact with the risk boundary in the unit frame N (step S4). Here, when the dark pixel is set as the correction target pixel, the video processing circuit 30 corrects a video signal that designates the application voltage Vc1. When the bright pixel is set as the correction target pixel, the video processing circuit 30 corrects a video signal that designates the application voltage Vc2.

Next, the video processing circuit 30 determines whether or not the pixel (that is, correction processing pixel) that corrects the video signal Vid in the processing of step S4 reaches the number of correction pixels that are set in advance (step S5). The video processing circuit 30 determines that the result of the processing of step S5 is "NO", until the number of the correction processing pixels reaches the number of the corrected pixels, and corrects the video signal Vid by one pixel, in the processing of step S5. Here, the dark pixel and bright pixel that are in contact with the risk boundary are set as the correction target pixels. Then, the video processing circuit 30 set the corrected video signal as the output video signal Vid-out, converts the signal into the data signal Vx, and outputs the converted signal.

In the present operation example 2, as illustrated in the unit frame N of FIG. 11C, the video processing circuit 30 corrects the video signal Vid of the correction target pixel in contact with the risk boundary. The video processing circuit 30 determines the correction target pixel with respect to the video signal Vid with the unit frame N−3, the unit frame N−2, and the unit frame N−1, according to the sequence described above.

However, in the example of FIG. 11C, the dark pixel and the bright pixel that are in contact with the risk boundary of the unit frame N−1 do not become the correction target pixels. This is performed by the correction which is performed under a condition that the result of the processing of step S3 is determined to be "NO", when the video processing circuit 30 specifies the pixel B of interest illustrated in FIG. 11C. With regard to the correction, if the video processing circuit 30 determines that the risk boundary is not moved from the unit frame N−2 to the unit frame N−1, in the processing of step S3 (step S3; NO), the video processing circuit 30 performs the processing of step S6.

Next, the video processing circuit 30 determines whether or not the risk boundary is detected on an opposite side to the unit frames N between which the pixel of interest is interposed, in the unit frame N−3 previous by two unit frames to the current frame, with regard to the pixel of interest in contact with the risk boundary detected in the unit frame N−1 (step S6). When the result of the processing of step S6 is determined to be "YES", the video processing circuit 30 performs the processing of step S4, and corrects the video signal Vid of the correction target pixel. Even when the risk boundary is not moved from the unit frame N−1 to the unit frame N, if the risk boundary is moved from the unit frame N−2 to the unit frame N−1, there is a possibility that the above-described tailing phenomenon is manifested. In order to prevent the tailing phenomenon from occurring, the video processing circuit 30 corrects the video signal Vid, even when the requirements of step S6 are satisfied.

As described above, when the liquid crystal panel 100 displays the moving image, the video processing circuit 30 determines the correction target pixel, and corrects the video signal Vid in such a manner that the tailing phenomenon does not occur.

The invention can be implemented by an embodiment different from the above-described embodiment. In addition, the modification examples that will be described below may be appropriately combined with each other.

Modification Example 1

In the above-described embodiment, the video processing circuit 30 detects the risk boundary that is moved from the (k−1)th unit frame to the kth unit frame by performing determination processing configured by (determination I) and (determination II). Instead of this, the video processing circuit 30 may detect the risk boundary that is moved from the (k−1)th unit frame to the kth unit frame, by performing determination processing of only (determination I). As described above, in the video in which the bright pixel is disposed by using the dark pixel as a background, when a pixel is changed from a dark pixel to a bright pixel, there is a high possibility that the risk boundary moves by one pixel size. According to the modification example, an amount of processing regarding the determination processing of the video processing circuit 30 is decreased.

In addition, the video processing circuit 30 may detect not only a risk boundary that is moved by one pixel size per one frame, but also a risk boundary that is moved by two-pixel sizes or more per one frame.

Modification Example 2

In the above-described embodiment, an example in which a VA method is used for the liquid crystal 105 is described, but a twisted nematic (TN) method may be used. In a case of a normally white liquid crystal panel, a relationship between a voltage that is applied to the pixel 110 and transmissivity is contrary to that in a case of a normally black liquid crystal panel, and the lower the transmissivity is, the higher a voltage to be applied to the pixel 110 is. In this case, the video processing circuit 30 can specify the bright pixel according to a condition of the first pixel of the above-described embodiment, and can specify the dark pixel according to a condition of the second pixel.

Modification Example 3

The invention is not limited to an application to an electro-optical device 1 that employs the above-described pseudo high resolution, and can be applied to a device that drives a liquid crystal panel, based on a signal indicating a video in which the first video and the second video that is obtained by moving the first video in parallel are alternately switched for each frame. For example, when 3D video is displayed by a frame sequential type, a left-eye image and a right-eye image can be alternately switched for each frame and displayed. At this time, in order to provide parallax, the left-eye image, and the right-eye image which is obtained by moving (shift) the left-eye image in parallel are used. In this case, one of the left-eye image and the right-eye image can be called the image A, and the other can be called the image B. Even in this case, by the same operation as in the above-described embodiment, a decrease of the display quality of the still image is suppressed and the reverse tilt domain is suppressed.

In addition, the video processing circuit 30 may not include the video signal generation unit 31. In this case, the video processing circuit 30 performs various video processing items, based on the video signal Vid-d indicating the image A or the image B that is supplied from an external device.

In addition, the number of sub-frames that the image A or the image B is continuous, that is, the number of sub-frames that configure unit frames is not limited to 2, and may be 3 or more.

Modification Example 4

In the above-described embodiment, when the result of the processing of step S6 is determined to be "YES", the video processing circuit 30 corrects the video signal Vid, but the correction may be omitted.

In addition, the boundary detection unit 32 may detect the risk boundary set by a tilt orientation of the liquid crystal 105, in a portion of the risk boundary between the dark pixel and the bright pixel. In this case, the boundary detection unit 32 detects a risk boundary which is easily causes the reverse tilt domain, according to the tilt orientation of the liquid crystal 105.

Modification Example 5

The shift device 200 may be an element (device) other than a liquid crystal, if the element (device) is an element with a function to shift an optical path. For example, the shift device 200 may be realized by a mechanical method performed by a MEMS.

Modification Example 6

In the above-described embodiment, the video processing circuit 30 actually retains the video signal Vid with three unit frames of k−2, k−1, and k, and detects the risk boundary, based on the video signal Vid with each unit frame. In this case, the video processing circuit 30 retains data (for example, 8 bits) indicating an application voltage for each pixel, with regard to the three unit frames. Instead of this, the video processing circuit 30 may retain not only the data indicating the application voltage, but also the data indicating the presence and absence of the risk boundary, with regard to the unit frames k−2 and k−1 prior to the kth unit frame. In this case, the video processing circuit 30 may only retain the data (for example, one bit) indicating the presence and absence of the risk boundary for each pixel, with regard to two unit frames of k−2 and k−1. According to the modification example, an amount of pieces of data to be retained in the video processing circuit 30 is decreased.

Modification Example 7

The dark pixel and the bright pixel may be specified by a condition other than the condition of the above-described embodiment. For example, a pixel in which an application voltage designated to the pixel 110 is higher than a threshold (a third threshold voltage) set in advance may be set as the dark pixel, and a pixel in which the designated application voltage is higher than a threshold (fourth voltage) higher than the threshold may be set as the bright pixel. In addition, when an application voltage difference (voltage difference) between two pixels adjacent to each other is higher than the threshold, a pixel on a high potential side may be set as the bright pixel, and a pixel on a low potential side may be the dark pixel (in a case of a normal black mode).

That is, the dark pixel and the bright pixel are two pixels adjacent to each other, alternatively, if the dark pixel and the bright pixel are configured by combining the pixel 110 designated by the application voltage and the pixel 110 designated by an application voltage higher than the application voltage, all kinds of specifications with conditions other than that may be applied.

The liquid crystal panel 100 is not limited to a transmission type, and may be a reflection type.

The electro-optical device 1 is not limited to four-fold speed drive, and for example, may be a device that employs other speed drives, such as two-fold speed drive or eightfold speed drive, and may be a device that employs normal speed drive.

Next, in the above-described embodiment, as an example of an electronic apparatus to which the electro-optical device 1 can be applied, the projector 2100 that uses the liquid crystal panel 100 as a light valve is described. As the electronic apparatus, in addition to the projector 2100 described with reference to FIG. 1, an apparatus including, a television, a viewfinder type and a monitor direct view type video tape recorder, a car navigation device, a pager, an electronic notebook, an electronic calculator, a word processor, a workstation, a video telephone, a POS terminal, a digital still camera, a cellular phone, a smart phone, a tablet type terminal, or a touch panel, can be used. Then, the electro-optical device 1 can be applied to such various electronic apparatuses.

REFERENCE SIGNS LIST

1 Electro-optical device
10 Control circuit
20 Scan control circuit
30 Video processing circuit
40 Shift control circuit
100 Liquid crystal panel
100a Element substrate
100b Counter substrate
105 Liquid crystal
108 Common electrode
110 Pixel
118 Pixel electrode
31 Video signal generation unit
32 Boundary detection unit
321 First boundary detection unit
322 Delay circuit
323 Second boundary detection unit
324 Delay circuit
325 Third boundary detection unit
33 Correction processing unit
331 First determination unit
332 Second determination unit
333 Correction unit
34 D/A conversion unit
200 Shift device
2100 Projector

The invention claimed is:

1. A video processing circuit comprising:
a boundary detection unit that detects a boundary between a first pixel to which an application voltage which is a first voltage is applied, and a second pixel to which an application voltage which is a second voltage higher than the first voltage is applied, based on a video signal which designates the application voltage for each pixel of a liquid crystal panel having a plurality of pixels for each unit frame, and indicates a video which alternately switches between a first video and a second video which is obtained by moving in parallel with the first video for each unit frame;
a first determination unit that determines whether or not a boundary detected by the boundary detection unit in a kth (k is a natural number) unit frame exists in a (k−2)th unit frame;
a second determination unit that determines whether or not the boundary detected in the kth unit frame is a boundary which is moved from a (k−1)th unit frame to the kth unit frame;
a correction unit that sets as a correction target pixel a pixel which is in contact with a boundary that is determined not to exist in the (k−2)th unit frame by the first determination unit and that is determined to have moved from the (k−1)th unit frame to the kth unit frame by the second determination unit, among the boundaries detected in the kth unit frame, and corrects the application voltage in such a manner that a fringe electric field occurring at the boundary is decreased; and
an output unit that outputs a signal according to a video signal in which the application voltage is corrected by the correction unit, in such a manner that the liquid crystal panel is driven based on the signal.

2. The video processing circuit according to claim 1, wherein the second determination unit determines that, when the boundary detected in the kth unit frame is in contact with a pixel which is changed from the first pixel to the second pixel, from the (k−1)th unit frame to the kth unit frame, the boundary is moved.

3. The video processing circuit according to claim 2, wherein the second determination unit determines that, when the boundary is in contact with the changed pixel, and the boundary is detected at opposite side to the kth unit frame with the changed pixel interposed therebetween, in the (k−1)th unit frame, the boundary is moved.

4. The video processing circuit according to claim 1, wherein the correction unit determines that a pixel which is in contact with the boundary that is not the moved boundary, among the boundaries detected in the kth unit frame, is set as the correction target pixel, when the boundary is detected at opposite side to the frame with the pixel interposed therebetween, in the (k−2)th unit frame.

5. A video processing method comprising:
detecting a boundary between a first pixel to which an application voltage which is a first voltage is applied, and a second pixel to which an application voltage which is a second voltage higher than the first voltage is applied, based on a video signal which designates the application voltage for each pixel of a liquid crystal panel having a plurality of pixels and indicates a video which alternately switches between a first video and a second video which is obtained by moving in parallel with the first video for each unit frame;
determining whether or not a boundary detected by a boundary detection unit in a kth (k is a natural number) unit frame exists in a (k−2)th unit frame;
determining whether or not the boundary detected in the kth unit frame is a boundary which is moved from a (k−1)th unit frame to the kth unit frame;
setting as a correction target pixel a pixel which is in contact with a boundary that is determined not to exist in the (k−2)th unit frame by a first determination unit and is determined to have moved from the (k−1)th unit frame to the kth unit frame by a second determination unit, among the boundaries detected in the unit frame k, and correcting the application voltage in such a manner that a fringe electric field occurring at the boundary is decreased; and
outputting a signal according to a video signal in which the application voltage is corrected, in such a manner that the liquid crystal panel is driven based on the signal.

6. An electro-optical device comprising:
a liquid crystal panel having a plurality of pixels;
a boundary detection unit that detects a boundary between a first pixel to which an application voltage which is a first voltage is applied, and a second pixel to which an application voltage which is a second voltage higher than the first voltage is applied, based on a video signal which designates the application voltage for each pixel of a liquid crystal panel, and indicates a video which alternately switches between a first video and a second video which is obtained by moving in parallel with the first video for each unit frame;

a first determination unit that determines whether or not a boundary detected by the boundary detection unit in a kth (k is a natural number) unit frame exists in a (k−2)th unit frame;

a second determination unit that determines whether or not the boundary detected in the kth unit frame is a boundary which is moved from a (k−1)th unit frame to the kth unit frame;

a correction unit that sets as a correction target pixel a pixel which is in contact with a boundary that is determined not to exist in the (k−2)th unit frame by the first determination unit and that is determined to have moved from the (k−1)th unit frame to the kth unit frame by the second determination unit, among the boundaries detected in the kth unit frame, and corrects the application voltage in such a manner that a fringe electric field occurring at the boundary is decreased; and a drive circuit that drives the liquid crystal panel, based on a video signal in which the application voltage is corrected by the correction unit.

7. The electro-optical device according to claim 6, further comprising:

an optical path shift unit that shifts an optical path of light which is modulated by the liquid crystal panel; and a shift control circuit that controls the optical path shift unit, according to a video signal which is used for driving the liquid crystal panel and displays any one of the first video and the second video.

8. An electronic apparatus comprising the electro-optical device according to claim 6.

9. The video processing circuit according to claim 2, wherein the correction unit determines that a pixel which is in contact with the boundary that is not the moved boundary, among the boundaries detected in the kth unit frame, is set as the correction target pixel, when the boundary is detected at opposite side to the frame with the pixel interposed therebetween, in the (k−2)th unit frame.

10. The video processing circuit according to claim 3, wherein the correction unit determines that a pixel which is in contact with the boundary that is not the moved boundary, among the boundaries detected in the kth unit frame, is set as the correction target pixel, when the boundary is detected at opposite side to the frame with the pixel interposed therebetween, in the (k−2)th unit frame.

11. An electronic apparatus comprising the electro-optical device according to claim 7.

* * * * *